(12) United States Patent
Gale et al.

(10) Patent No.: US 7,150,785 B2
(45) Date of Patent: Dec. 19, 2006

(54) HIGH PERFORMANCE ASPHALT USING ALKYL AROMATIC SULFONIC ACID ASPHALTENE DISPERSANTS

(75) Inventors: Mary Josephine Gale, Forest (CA); Lyle Edwin Moran, Sarnia (CA); Ramesh Varadaraj, Flemington, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 11/173,970

(22) Filed: Jul. 1, 2005

(65) Prior Publication Data

US 2006/0011101 A1    Jan. 19, 2006

Related U.S. Application Data

(60) Provisional application No. 60/588,742, filed on Jul. 16, 2004.

(51) Int. Cl.
*C09D 195/00*    (2006.01)

(52) U.S. Cl. .................................... 106/274; 106/275
(58) Field of Classification Search ................ 106/274, 106/275
See application file for complete search history.

(56) References Cited

U.S. PATENT DOCUMENTS

| | | | | |
|---|---|---|---|---|
| 2,278,954 | A | * | 4/1942 | Thurston ..................... 106/275 |
| 4,440,579 | A | * | 4/1984 | Eidem ......................... 106/274 |
| 4,713,117 | A | * | 12/1987 | Goodrich .................. 106/273.1 |
| 6,444,731 | B1 | * | 9/2002 | Memon ........................ 524/59 |

* cited by examiner

*Primary Examiner*—David Brunsman
(74) *Attorney, Agent, or Firm*—Joseph J. Allocca

(57) ABSTRACT

Disclosed is a high performance asphalt comprising a mixture of low to moderate performance asphalt with linear or branch chain alkyl substituted aromatic sulfonic acid. The high performance asphalt is made by mixing the low to moderate performance asphalt with 1 to 10 wt % linear or branched chain $C_8$–$C_{48}$ alkyl substituted aromatic sulfonic acid at a temperature of 175° C. and less.

16 Claims, 8 Drawing Sheets

Superpave Asphalt Binder Performance Matrix

Typical 'A' Quality Asphaltic Crude Superpave Performance Versus Super Crudes

Variation in PG Quality for Asphalt Production

Alkyl Sidechain and Sulfonic Acid Group Impart Balanced Improvement in HT and LT Stiffness of Modified Asphalt With Cold Lake Asphalt Other Acids Do Not Impart the Same Modified Asphalt Performance as Alkylated Sulfonic Acids (a) Polyphosphoric Acid More Sensitive to Reacting With Anti-strip Additive Alkyl Sulfonic Acid Enhances Performance of a Wide Range of Neat and Blended Asphalts (b) Stearic Acid (C$_{18}$ carboxylic acid) and Neutralized Sulfonic Acid Have No Effect Design of Experiments for XSA-1416 ($C_{14}/C_{16}$ Mono-alkylated Xylene Sulfonic Acid-$HSO_3$ on alkyl chain) Modified Asphalt With respect to Additive Level, Addition Rate, Mixing Temperature and Mixing Time

HIGH PERFORMANCE ASPHALT USING ALKYL AROMATIC SULFONIC ACID ASPHALTENE DISPERSANTS

This application claims the benefit of U.S. Ser. No. 60/588,742 filed Jul. 16, 2004.

BACKGROUND OF THE INVENTION

1. Field of the Invention

The present invention relates to high performance asphalt, especially paving binder asphalt described by the SUPERPAVE™ specification using the nomenclature Performance Grade PGXX-YY comprising low to moderate performance grade asphalt modified by addition of a performance improving additive to produce an asphalt boosted to the high performance grade level.

2. Description of the Related Art

Asphalt is a viscoelastic semi-solid bituminous material derived from the distillation residue of crude petroleum. Asphalt may be obtained from a variety of sources including straight run vacuum residue, mixtures of vacuum residue with diluents such as vacuum tower wash oil, paraffin distillate, aromatic and naphthenic oils and mixtures thereof, oxidized vacuum residues or oxidized mixtures of vacuum residues and diluent oils and the like. Other asphalt materials include coal tar pitch, rock asphalt and naturally occurring asphalt. Typically asphalt will have a normal atmospheric boiling point of at least about 350° C., more typically at least 440° C., and will have a penetration range from 20–500 dmm at 25° C. (ASTM D-5). Because it is hydrophobic and has good adhesive and weathering characteristics, it is widely used as a binder or cement for stone or rock aggregate in pavement construction (typically only about 5 wt % of the mixture). If, because of the nature of the crude oil distilled, the asphalt is too soft at ambient temperature, a harder product may be manufactured, for example, by increasing the vacuum distillation tower temperature, by extraction of the lighter components with liquid propane or other solvents, or by oxidizing by air blowing at an elevated temperature. However, in most cases, these manufacturing processes can produce asphalts that are too brittle at low temperature, and result in excessive cracking in cold weather. Another means of stiffening soft asphalt with less detrimental impact on its low temperature properties and so as to extend its useful temperature range is by blending with suitable polymers. Polymers can reduce the tendency of an asphalt pavement to creep and rut in warm weather by increasing its high temperature viscoelastic stiffness and at the same time permit the use of softer grades of asphalt to minimize cracking in cold weather. Thus, polymers have been added which permit the use of, in some instances, softer grades of asphalt to reduce cracking in cold weather without risking excessive softening leading to undesirable deformation/rutting in hot, summer weather. Unfortunately, many of such asphalt-polymer blends are not storage stable, especially when the polymer content exceeds 3 wt % of the mixture.

For example, a polymer such as polyethylene has been added to asphalt to produce asphalts which exhibit an increased resistance to creep or deformation. In addition, polyethylene modified asphalts must also have good compatibility between the asphalt and polyethylene, and be stable at high temperatures during storage and asphalt plant operation for ease of handling and application. Compatibility between the polyethylene and asphalt is very important to ensure that the engineering properties of both the asphalt and polyethylene are transferred to the finished product and to provide good long term performance. However, most polyethylene modified asphalts require either continuous mixing or the addition of various additives to avoid phase incompatibility (see for example U.S. Pat. Nos. 4,240,946 and 4,314,921) which require continuous high shear mixing to obtain physical dispersion of a polyolefin in bitumen, and Jew et al, Journal of Applied Polymer Science, 31, pp. 2685–2704 (1986) which discloses the addition of one or more dispersants to a polyethylene modified asphalt to avoid phase separation.

The addition of block copolymer such as styrene-butadiene-styrene (SBS) serves to modify asphalt for additional applications, such as roofing sheets, adhesives and coatings. For example, German Patent No. 2,255,173 discloses the addition of thermoplastic block copolymers (such as SBS copolymer) to straight-run asphalt after which small amounts of mineral acid (such as phosphoric acid or hydrochloric acid) are added to stabilize the resulting product, which has higher elasticity and greater range of plasticity than straight-run asphalts.

In another example, Japanese Patent No. 51-53522 discloses an asphaltic composition having improved strength due to the addition of a natural or synthetic rubber (e.g., styrene-butadiene copolymer) and an unsaturated acid, including the anhydrides of said acid. The asphaltic material may be straight-run asphalt, semi-blown asphalt, blown asphalt, tar, pitch or mixtures thereof. In addition, Japanese Patent 56-115354 teaches pre-reacting SBS polymer with unsaturated dicarboxylic acids and derivatives thereof (such as maleic acid, fumaric acid, chloromaleic acid, itaconic acid, cis-4-cyclohexene-1,2-dicarboxylic acid, endo-cis-bicyclo(2,2,1)-5-heptane-2,3-dicarboxylic acid, and acid anhydrides, esters, amides, imides, etc., of the dicarboxylic acid) and adding the mixture thus formed to asphalt to improve its adhesiveness, strength and deformation resistance. The resulting product is useful as a pavement structure for roadways which experience heavy repetitive loads. Among the preferred dicarboxylic acids and derivatives thereof are maleic acid, fumaric acid, and maleic anhydride.

With few exceptions, as disclosed in EP 0 885 935, the addition of polymers to asphalts has not been successful in extending the low temperature service (i.e., cracking temperature) properties below −39° C. while maintaining high temperature performance of at least 52° C.

Asphalt is made by distillation under vacuum to a cut temperature yielding, typically, a resid with particular penetration at 25° C. and viscosity at 100° C. Once it meets the specific penetration and viscosity ranges the asphalt is routed to a rundown tank where it is held for certification testing against all specifications. Once it meets the specifications the tank of asphalt is certified and sealed until shipped to the customer with no new asphalt production added. Prior to delivery it is stored in the refinery at industry typical temperatures depending on the hardness or stiffness of the asphalt. Reference is made to a best practices publication issued by the Asphalt Paving Environmental Council comprising The Asphalt Institute, the National Asphalt Paving Association and the State Asphalt Pavement Associations entitled "Best Management Practices to Minimize Emissions During HMA Construction", EC 101 04/00. This publication contains a table insert of "Typical Asphalt Binder Temperatures". The highest stiffness, lowest penetration asphalt listed, designated as PG 82-22 has a recommended hot mix asphalt (HMA) plant asphalt storage tank temperature range of 157 to 168° C. and a recommended HMA plant mixing temperature of 143 to 171° C. when mixing the fluid asphalt with the aggregate to adequately cover all of the aggregate surface area. In order to accommodate this industry practice the asphalt manufacturer strives to deliver to the HMA plant at an industry accepted 176° C. maximum. This requires that the asphalt manufacturer heat the asphalt at the lowest possible temperature to guarantee delivery to these temperature limits. This practice of minimizing emissions translates to mixing and blending vacuum resid asphalt and enhanced asphalts to the lowest, feasible temperature ranges. In addition to generating emissions, storage of asphalt at higher temperatures can lead to product hardening during storage and difficult handling and unloading at the HMA plant. Therefore, industry practice is to store asphalt and asphalt based products to the lower temperatures as soon as possible following manufacture.

It is not always practical to keep an asphalt-polymer blend continuously homogenized before mixing the blend with aggregates: consequently, storage stability is desirable to keep the blend from separating under storage conditions. Various methods have been suggested for making polymer modified asphaltic compositions that are sufficiently storage stable and that also have the visco-elastic properties in the ranges required for a particular application. In most of cases, this results in products for which the softening point property is strongly affected by the nature of the virgin asphalt.

Other components have been added to asphalts and polymer modified asphalts to improve their physical properties such as storage stability and viscoelastic properties. U.S. Pat. No. 5,348,994 teaches the preparation of storage stable pavement binder having improved viscoelastic properties inter alia by cosulfonation followed by neutralization of a blend of asphalt and polymer having some unsaturated bonds. U.S. Pat. No. 5,070,123 discloses a method of improving storage stability by first adding an inorganic acid such as hydrochloric acid, phosphorus pentoxide and preferably, phosphoric acid to an asphalt then adding from about 1.0 to about 15 wt % polymer to the blend. U.S. Pat. No. 4,882,373 discloses an asphaltic composition having improved tensile properties produced by the process of contacting an asphalt with a mineral acid to form an acid modified asphalt, oxidizing the resulting material to form an acid/oxygen modified asphalt, contacting it with a thermoplastic elastomer and then with specified unsaturated functional monomers. Phosphoric acid is disclosed as one of the mineral acids. U.S. Pat. No. 5,565,510 discloses the addition of polyphosphoric acid to bitumen then blending with that product a polymer containing a propylene homo- or co-polymer, a xylene soluble co-polymer fraction and optionally a xylene insoluble ethylene co-polymer fraction. U.S. Pat. No. 3,751,278 discloses treatment of an asphalt with a phosphoric acid mixture having a $H_3PO_4$ equivalent of greater than 100% concentration and including ortho-, pyro-, and poly-phosphoric acids. German patent DE 2255173 C3 teaches the use of 85% o-phosphoric acid, i.e., the addition of low molecular weight phosphoric acid.

SUPERPAVE™ criteria (as described in the June 1996 edition of the AASHTO Provisional Standards Book and 2003 revised version) can be used to define the Maximum and Minimum Pavement service temperature conditions under which the binder must perform. SUPERPAVE™ is a trademark of the Strategic Highway Research Program (SHRP) and is the term used for new binder specifications as per AASHTO MP-1 standard. Maximum Pavement Temperature (or "application" or "service" temperature) is the temperature at which the asphalt binder will resist rutting (also called Rutting Temperature). Minimum Pavement Temperature is the temperature at which the binder will resist cracking. Low temperature properties of asphalt binders were measured by Bending Beam Rheometer (BBR). According to SUPERPAVE™ criteria, the temperature at which a maximum creep stiffness (S) of 300 MPa at 60s loading time is reached, is the Limiting Stiffness Temperature, LST. Minimum Pavement Temperature at which the binder will resist cracking (also called Cracking Temperature) is equal to LST-10° C.

Certain asphalts derived from particular crude sources such as Escalante, Canadon Seco, Boscan, Menemota and Napo crudes exhibit inherently high performance and are characterized as meeting a SUPERPAVE™ binder specification of PG 58-34 to 64-34.

While such asphalts can be and typically are further modified by the addition of polymers or copolymers or by air blowing or phosphoric acid treatment, the base asphalt by being inherently a high performance grade asphalt can make do with less of such treatment or such additives or can even dispense totally with such treatment or additives.

In the case of polymer or copolymer additives the elimination of the need to employ polymers to improve and expand the range of low temperature and high temperature performance would avoid stability and separation problems. The elimination of costly additives obviously effect a significant cost saving while the elimination of air blowing reduces cost and treatment and processing complexity.

Air-blowing, for instance, employs catalysts and is used to make industrial asphalt. Air blowing equipment is costly and requires maintenance while the catalyst further increases costs and processing complexity. Further environmental concerns exist regarding air filtration requiring additional equipment and maintenance along with licensing and inspection issues. If catalysts are eliminated the use of high processing temperatures becomes necessary, on the order of 300° F. to 500° F. for 1–30 hours followed by additional heating step at about 300° F. in the presence of a polymerization catalyst, see U.S. Pat. No. 2,179,208.

U.S. Pat. No. 4,713,117 teaches a process for modifying the physical properties of bituminous materials and asphalt compositions without air blowing by mixing a particular bituminous feed material with from 0.1 to 20.0 wt % of an organic sulfonic acid, said mixing being conducted at a temperature in the range of 351° F. to 600° F. (177.2° C. to 315.5° C.) whereby the softening range of the feed is substantially increased and the penetration is significantly decreased by 5 to 80 dmm at 77° F.

The organic sulfonic acid can be an alkylbenzene sulfonic acid wherein the alkyl group contains 1–20 carbons.

U.S. Pat. No. 4,440,579 teaches a process for air blowing asphalt in the presence of organic sulfonic acids as catalyst. The organic sulfonic acid can be an alkyl benzene or alkyl naphthalene sulfonic acid wherein the alkyl group contains from 1–20 carbons. The asphalt is heated to a temperature of about 200° F. to 350° F. and thoroughly mixed with the sulfonic acid catalyst and thereafter air blown. More specifically the asphalt is heated to a temperature of from about 400–550° F. and the air blowing is for from 0.5 to about 12 hours.

It would be desirable to secure a high grade paving asphalt similar in performance to, e.g., Escalante, Canadon Seco, Menemota or Napo source asphalt and matching the performance of SUPERPAVE™ Performance Grade Binders, e.g., PG 58-34, PG 64-28, PG 64-34, etc., from low to moderate grade asphalt and without the use of air blowing or the addition of modifying polymers or copolymers.

SUMMARY OF THE INVENTION

A high performance grade paving asphalt having a SUPERPAVE™ binder specification improved in the HT direction or in both the HT and LT direction, preferably a specification of at least PG 58-34, PG 64-28, more preferably a specification of PG 64-34 and higher is produced from lower performance grade paving asphalt, i.e., paving asphalt typically of performance grade lower than PG 58-34 to PG 64-28, by addition thereto of a minor quantity of a linear or branched chain $C_8$–$C_{48}$ alkyl aromatic sulfonic acid at a temperature of 175° C. and less in the absence of any air blowing preferably the complete absence of any air blowing during the processing sequence.

The lower performance grade paving asphalt is identified as asphalts having a performance grade rating typically of PG 52-34, PG 52-28, PG 58-28 and PG 64-22 and lower.

Figure 1:
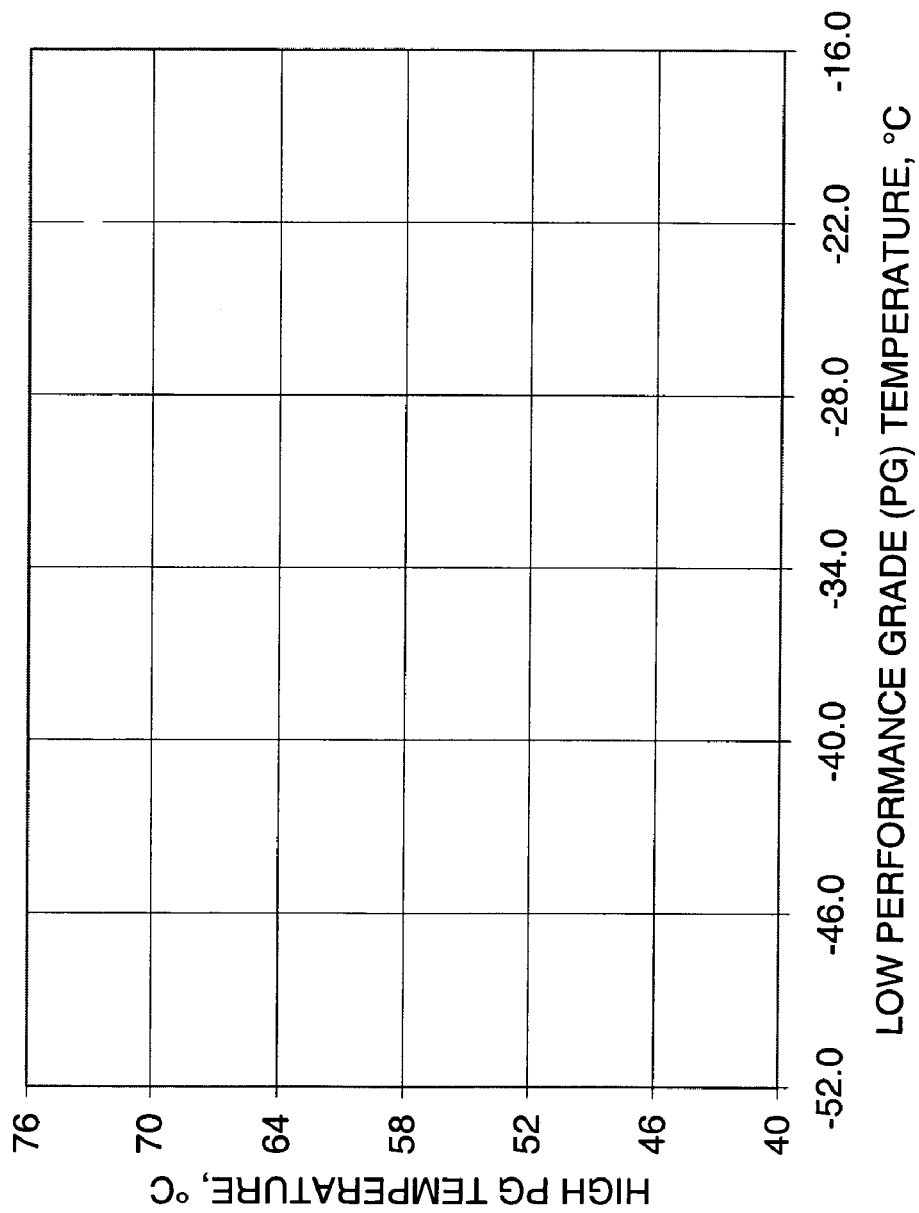
FIG. 1 is a presentation of a SUPERPAVE™ PG matrix wherein the vertical axis represents increasing high PG temperature stiffness and the horizontal axis represents decreasing low PG temperature stiffness towards the left.

The SUPERPAVE™ binder specifications for asphalt paving binder performance establishes the high temperature and low temperature stiffness properties of an asphalt. The nomenclature is PG XX-YY which stands for Performance Grade at high temperatures (HT), XX, and at low temperatures (LT), -YY degrees C., wherein -YY means a temperature of minus YY degrees C. Asphalt must resist high summer temperature deformation at temperatures of XX degrees C. and low winter temperature cracking at temperatures of -YY degrees C. An example popular grade in Canada is PG 58-28. Each grade of higher or lower temperature differs by 6° C. in both HT and LT. This was established because the stiffness of asphalt doubles about every 6° C. One can plot the performance of asphalt on a SUPERPAVE™ matrix grid. The vertical axis represents increasing high PG temperature stiffness and the horizontal axis represents decreasing low temperature stiffness towards the left. A SUPERPAVE™ PG matrix is shown in FIG. 1.

Figure 2:
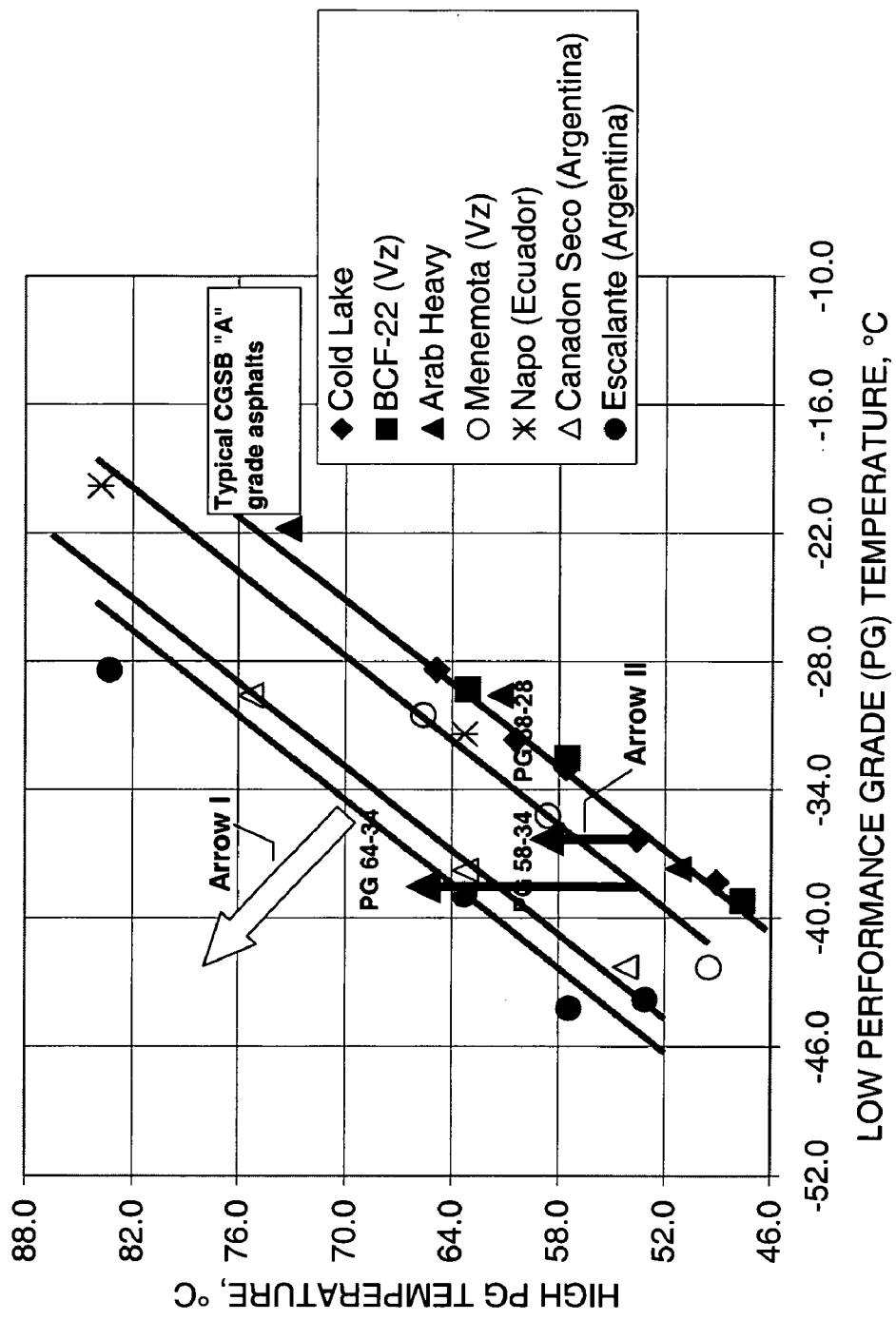
FIG. 2 is a plot on the SUPERPAVE™ PG matrix of four superior grade asphalts (Escalante, Canadon Seco, Menemota and Napo crude based asphalts) versus a current Canadian General Standards Board specification (CGSB-16.3-M90) "A" grade asphalt.

The SUPERPAVE™ matrix provides a guide on how to compare and rank exceptionally good, good and poor asphalts. FIG. 2 shows a matrix comparison for four superior grade asphalts versus a current Canadian General Standards Board specification based (CGSB-16.3-M90) "A" grade asphalt. Each crude type has a SUPERPAVE™ curve that is related to high distillation temperature fractions to the upper right and low distillation temperature fractions to the lower left. FIG. 2 shows the curves for excellent paving grade asphalts made from various asphaltic crudes. These curves pass through various PG specification boxes. Asphalt binders from a particular crude pass the SUPERPAVE™ specification criteria if they fall within the PG box through which the curves pass. Superior SUPERPAVE™ grade asphalts are those which at least match or fall above the curve for the Menemota crude based asphalt.

Directionally poorer asphalt performance is to the lower right. Target exceptional asphalt or enhanced, modified asphalt performance is to the upper left, most preferably in both the HT and LT performance directions, improvement which would fall directionally on an arrow or vector (Arrow I) emanating to the left almost perpendicularly from the base line curve of the base asphalt. Improvements in the vertical direction (Arrow II) usually require expensive equipment modification and, by being only in the HT stiffness direction are not as effective or desirable as improvements in the direction of Arrow I.

Figure 3:
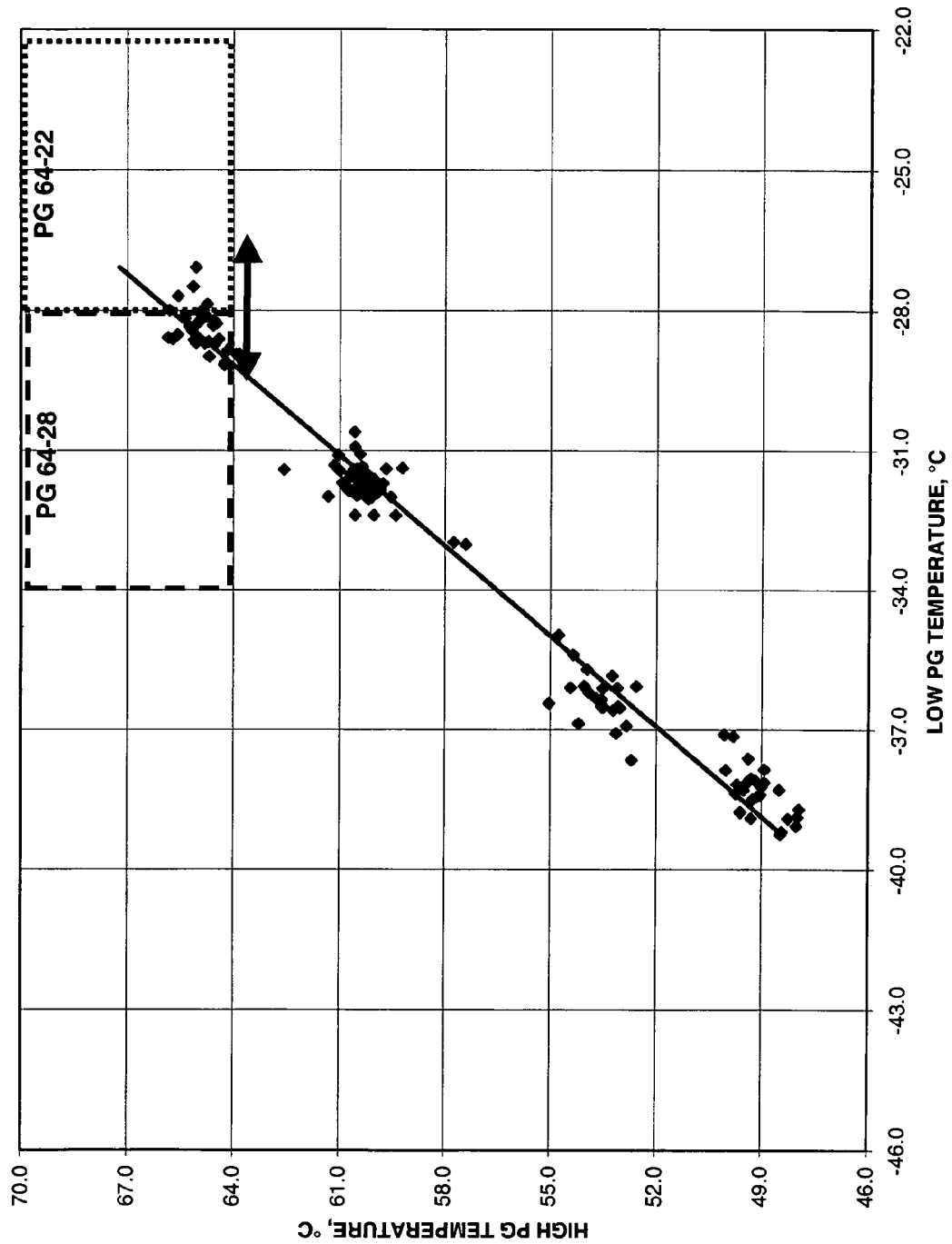
FIG. 3 is an enlargement of the PG binder performance matrix for a typical CGSB "A" grade asphalt showing that while the general curve passes through the lower right hand corner of PG 64-28, a number of samples of asphalt nominally corresponding to that grade actually fall into the PG 64-22 grade, a lower grade.

Asphalt that falls within a PG box, e.g., PG 64-28 in FIG. 3, although it can be considered as meeting the PG grade, may not be robust enough in terms of statistical quality control to guarantee the PG quality due to variation in the PG tests. This Superpave property variation is recognized by the asphalt industry as being as high at approximately +/−3° C. The 3° C. PG box matrix is used in FIG. 3 to demonstrate this point. As is shown in FIG. 3, although most of the time the asphalt passes through the PG 64-28 box, there are production batches that fall into the PG 64-22 inferior grade box. Unless the producer can establish precise quality control by using a narrow production range property, it is not possible to declare PG 64-28 quality all of the time. In other words, if one wants to consistently manufacture PG 64-28 one must ensure that the PG tests well within the box and not in the right lower corner of the box. Any treatment which moves the curve out of the lower right corner even if only in the HT direction is deemed to result in the production of a higher quality asphalt, even if nominally in the same grade.

The linear or branched chain $C_8$–$C_{48}$ alkyl aromatic sulfonic acid used in the present invention is generally of the formula:

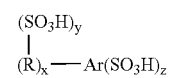

wherein x is an integer ranging from 1 to 5, preferably 1 to 3, more preferably 1–2, R is (a) a straight chain alkyl group of 8–48 carbons, preferably 10 to 36 carbons, more preferably 12–30 carbons, (b) a branched chain alkyl group wherein each branch is itself linear or branched and has from 8–24 carbons wherein each branch of the alkyl chain can have further branching with methyl, ethyl or mixtures of methyl and ethyl groups provided the total number of carbons attributable to the methyl and/or ethyl groups does not exceed 10, and the total number of carbons does not exceed 48, preferably does not exceed 36, (c) mixtures of (a) and (b), y is an integer ranging from 0 to 4, preferably 0 to 2, more preferably 1 when z=0, z is an integer ranging from 0 to 4 preferably 0 to 2, more preferably 1 when y=0 and wherein (y+z) ranges from 1–4 and Ar is an aromatic moiety having 1, 2 or 3 rings, or mixture thereof and wherein the multi ring aromatics are fused, spiro or linked by an alkylene linkage having 1 to 6 carbons, preferably 1 to 3 carbons, most preferably 1 carbon, preferably phenyl, naphthyl or anthracene, more preferably phenyl or naphthyl, most preferably phenyl.

Alkyl aromatic sulfonic acids of the following formula are non-limiting examples within the scope of the invention:

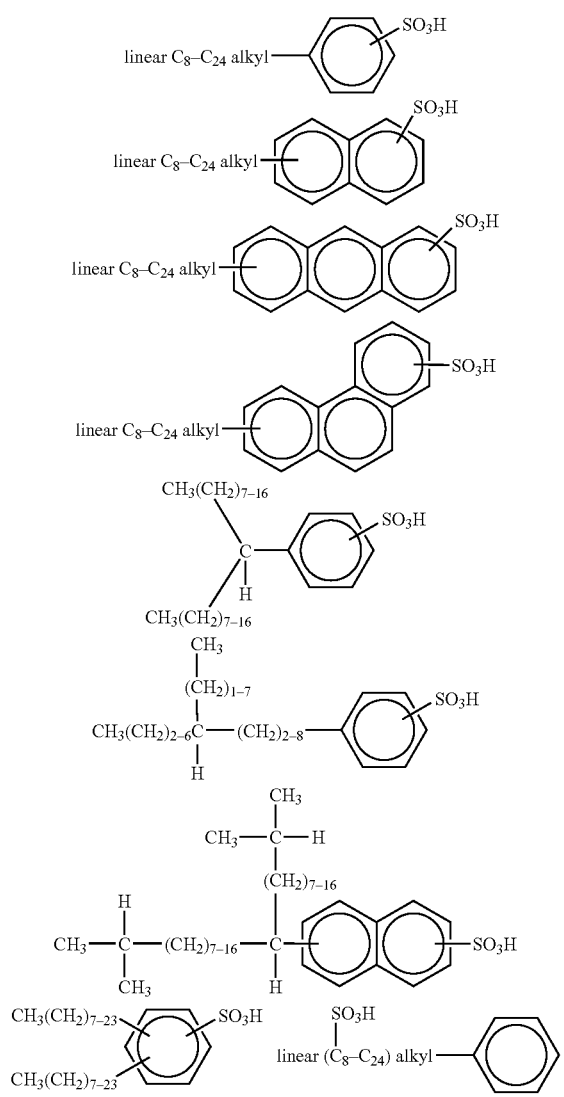
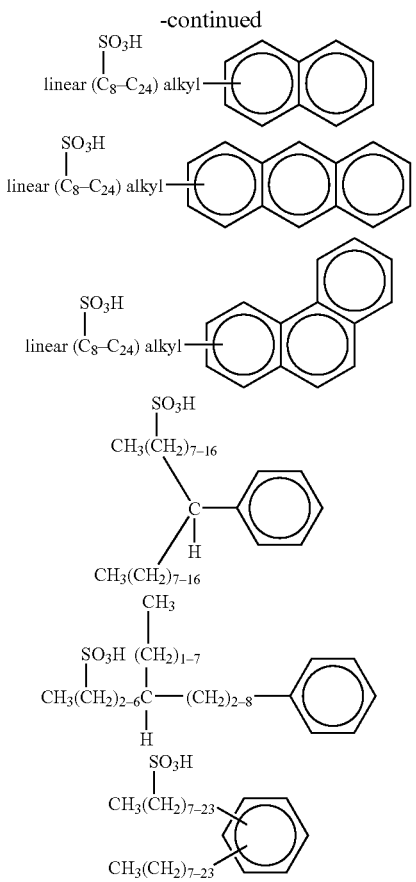

wherein the number of hydrogens in the ($CH_2$) alkylene groups are appropriately adjusted to reflect the presence of a $SO_3H$ group(s) on one or more of the carbons in the alkylene groups.

The process involves mixing the low to moderate performance grade asphalt with from about 0.5 to about 10 wt %, preferably about 0.5 to about 5.0 wt %, most preferably about 1.0 to about 3.0 wt % of the linear or branched chain alkyl aryl sulfonic acid at a temperature of up to 175° C., preferably up to about 170° C., more preferably up to about 160° C., most preferably between about 140–160° C. Reaction time and pressure are not important.

EXAMPLES

Figure 4:
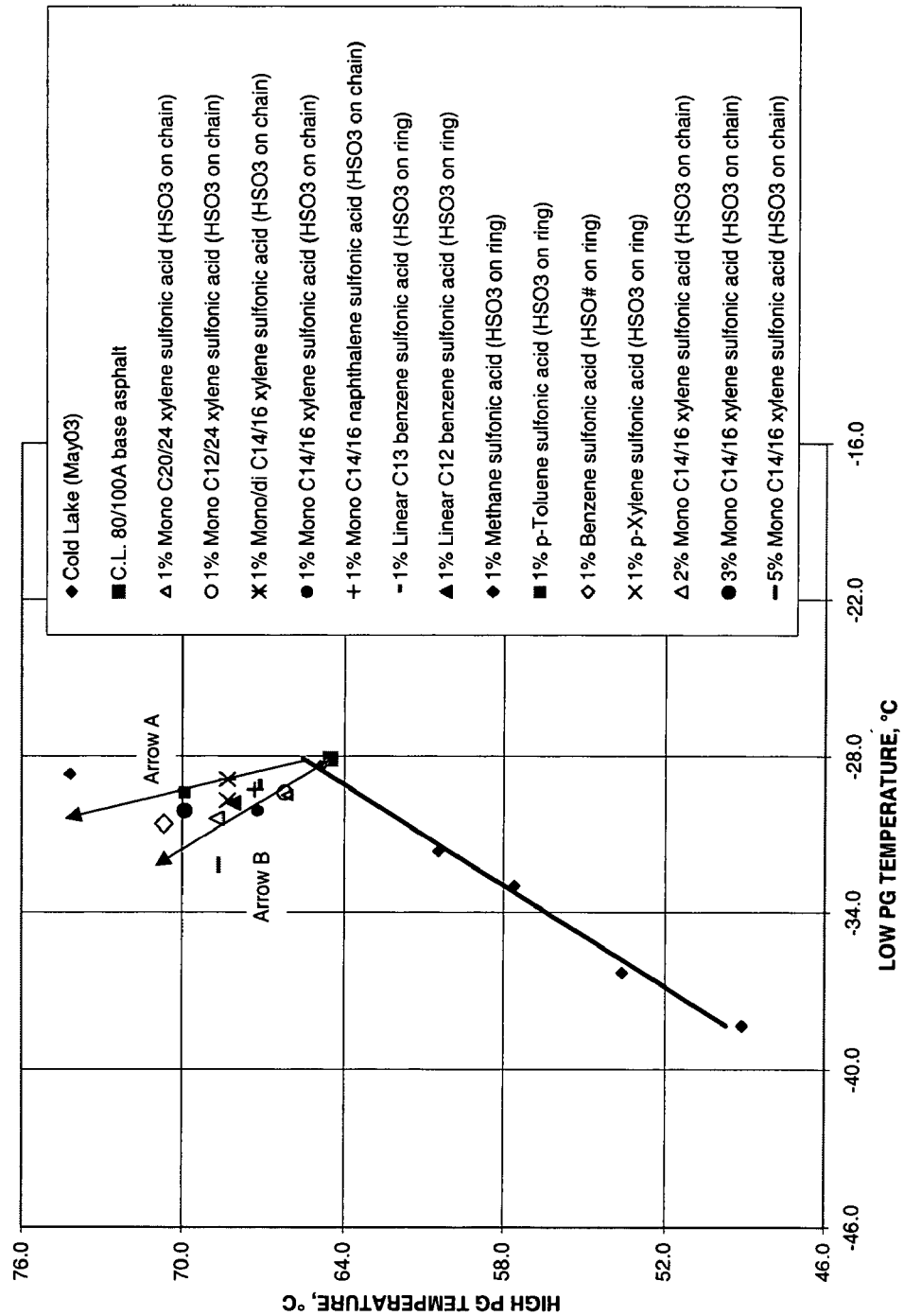
FIG. 4 presents the change in performance of a Cold Lake Asphalt 80/100A having a base SUPERPAVE™ performance of PG 64-28 as separate samples of the base asphalt are additized with different sulfonic acids at 140–150° C. to determine the effect each would have on the performance of the asphalt.

Cold Lake Asphalt 80/100A having a SUPERPAVE™ performance of PG 64-28 was employed as the base asphalt and subjected to combination with various sulfonic acids at 140–150° C. to determine the effect each would have on the performance of the asphalt. The results are presented in FIG. 4.

As is seen, modification made using 1% each of methane, p-toluene, benzene, and p-xylene sulfonic acids increased the HT stiffness of the asphalt but had a negligible impact on the LT performance. The arrow (arrow (A)) indicating the direction of improvement is almost vertical.

Modification using 1% mono $C_{20}/C_{24}$, mono-$C_{12}/C_{24}$, di $C_{14}/C_{16}$, mono-$C_{12}/C_{16}$, and 1, 2, 3 and 5% $C_{14}/C_{16}$ xylene sulfonic acids all showed improvement in both the high temperature and low temperature SUPERPAVE™ specification performance (arrow (B)). Performance improvements which trend more closely perpendicular to the base asphalt performance curve (as exemplified by arrow (B)) are the most desirable and are clearly associated with asphalt modified using the 1–5wt % mono $C_{12}/C_{16}$ phenyl sulfonic acid or naphthalene sulfonic acid.

Figure 5:
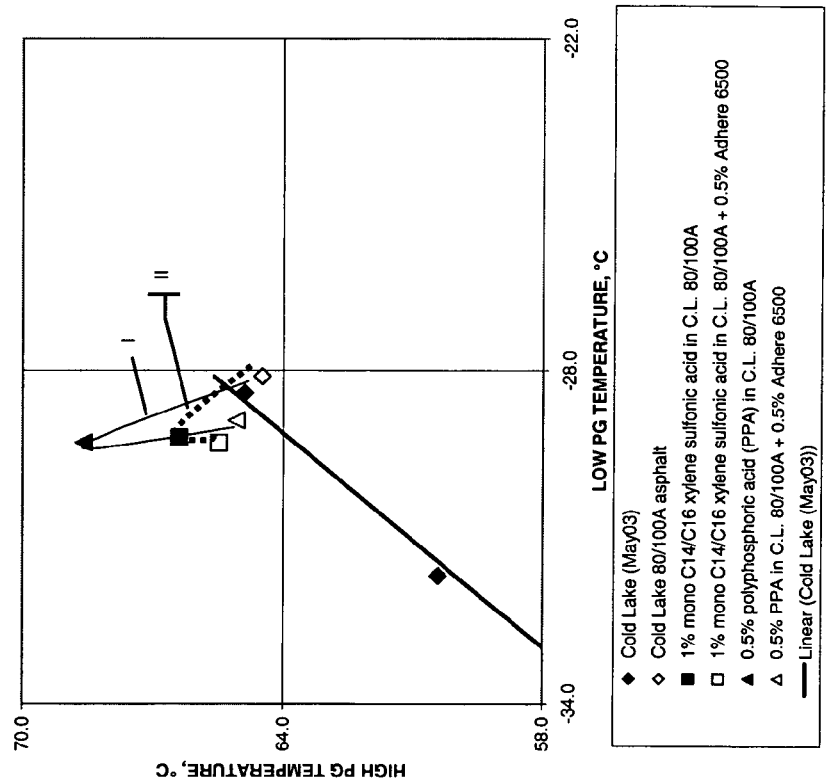
FIG. 5 shows that treating Cold Lake Asphalt with polyphosphoric acid only increases high temperature stiffness, there being no effect on the low PG temperature and that polyphosphoric acid treated asphalt is sensitive to amine anti-strip additives while the alkyl aryl sulfonic acid treated crude is much less sensitive to amine anti-strip additives.

Polyphosphoric acid (PPA) while mainly increasing the HT performance is known in the asphalt industry as being sensitive to an acid-base reaction with amine anti-strip additives, e.g., Adhere 6500. This reaction causes the enhanced PG properties attributable to PPA modification of asphalt to be essentially completely lost (Curve 1) as is shown in FIG. 5. By comparison alkyl aryl sulfonic acid modified asphalt appears to be much less sensitive to the amine anti-strip additive (curve II). The difference between PPA and alkyl aryl sulfonic acid performance is believed to be related to both the type of interaction/reaction with asphalt and the number of active sites in asphalt available for modification. In the case of PPA, phosphorous-oxygen-asphalt bonds are formed which remain vulnerable to reaction with a base. Conversely, with the alkyl aryl sulfonic acid and asphalt interaction there is both a solubilization in the asphalt by the alkyl sidechain and a strong interaction/reaction of the $HSO_3$ group with a limited number of available asphalt sites. It is thought that these reacted $HSO_3$ sites are irreversible with a base.

Figure 6:
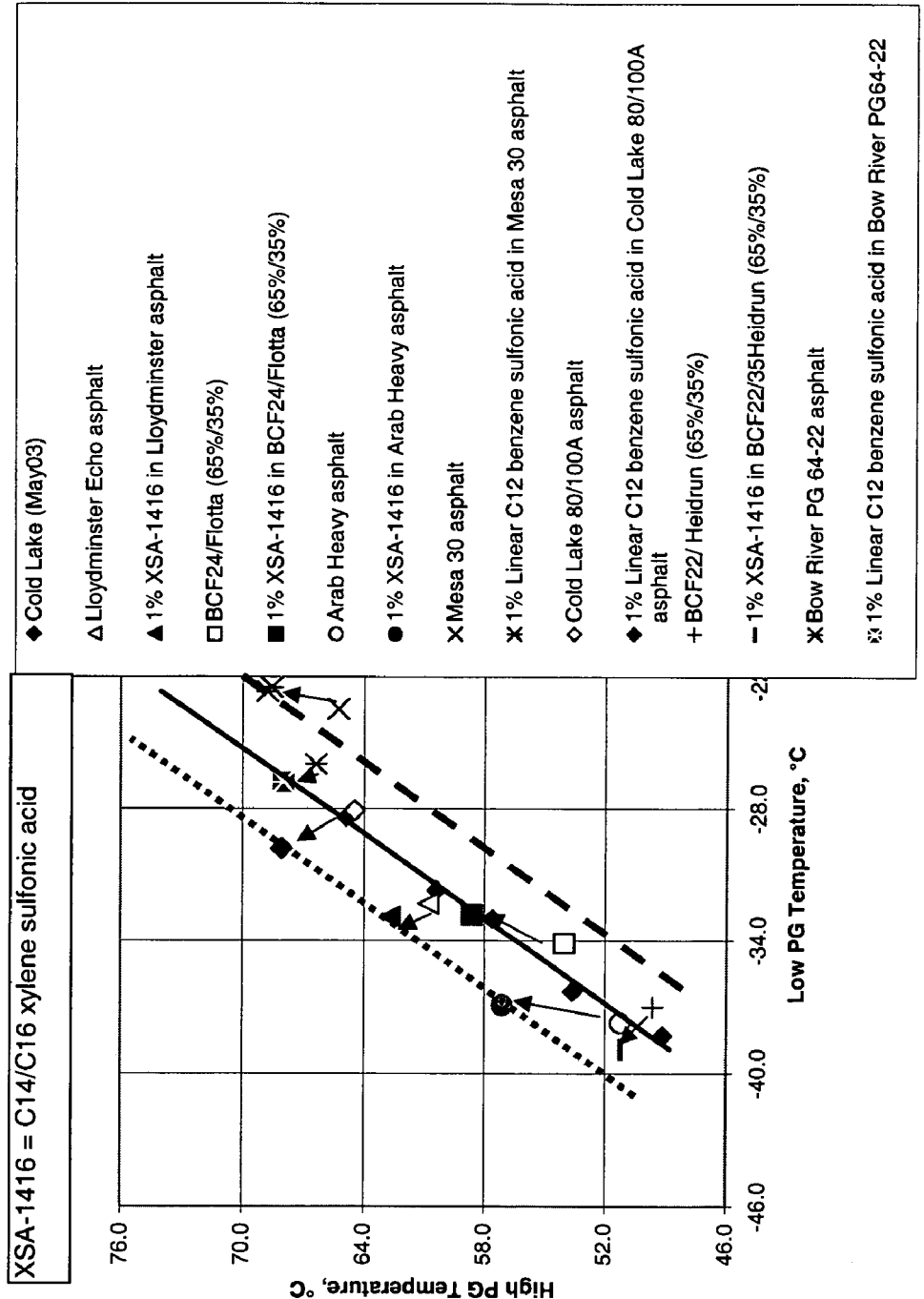
FIG. 6 presents the change in performance of a variety of neat and mixed asphalts having differing base SUPERPAVE™ performance as each base asphalt is additized with either of two sulfonic acids at 140–150° C. to determine the effect each would have on the performance of the asphalt.

A number of neat and mixed asphalts having differing base SUPERPAVE™ performance were modified at 140–150° C. using either of two sulfonic acids. XSA which is a $C_{14}$–$C_{16}$ xylene sulfonic acid or Calfsoft which is a linear alkyl benzene with the $SO_3H$ group on the benzene ring. The results are presented in FIG. 6. The asphalts evaluated were Cold Lake, Lloydminster Echo, BCF 24/Flotta (65/35), Arab Heavy, Mesa 30, Cold Lake 80/100A, BCF 22/Heidrun (65/35) and Bow River. In all cases either the HT performance or both the HT and LT performance of the asphalt was improved.

The same Cold Lake asphalt as used in Example 1 was modified using stearic acid or neutralized sulfonic acid. The results are presented in FIG. 7.

Figure 7:
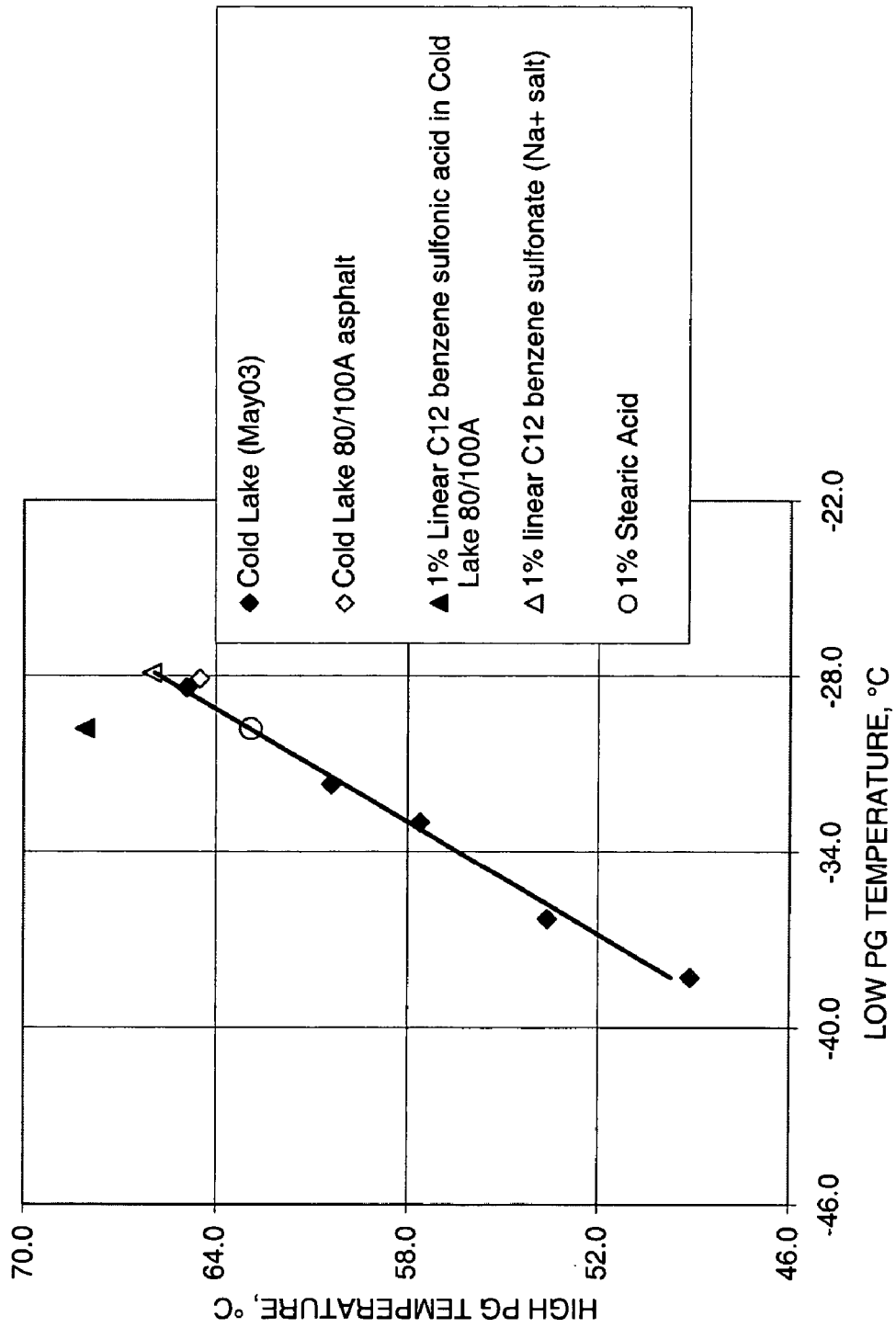
FIG. 7 shows that stearic acid and neutralized linear $C_{12}$ benzene sulfonic acid (a salt) have no effect on the SUPERPAVE™ performance as compared with the positive effect of linear $C_{12}$ benzene sulfonic acid.

In each case when using neutralized sulfonic acid or stearic acid the asphalt performance did not improve at all whereas treatment using 1% linear C12 benzene sulfonic acid showed significant improvement (FIG. 7).

Figure 8:
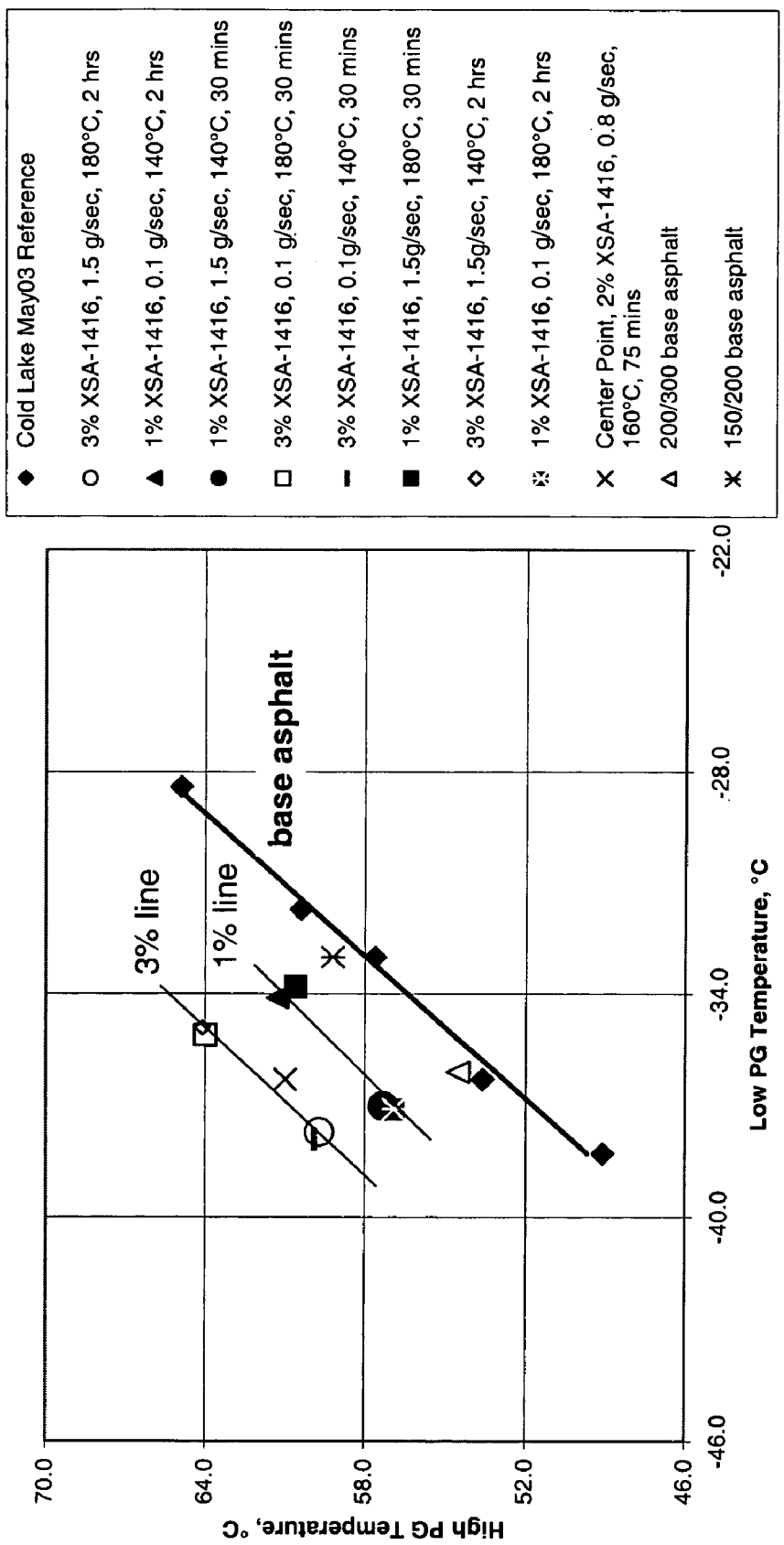
FIG. 8 shows that the improvement effected by the sulfonic acid modification of the asphalt works the same across the range of treat levels, addition rates, mixing temperatures and mixing times.

A design of experiments (DOE) using Statgraphics was conducted to determine the effective ranges for additive level, addition rate, mixing temperature and mixing time and were each analyzed continuously within the ranges. The high and low additive levels were 3% and 1%; the high and low addition rates were 1.5 g/sec and 0.1 g/sec; the high and low mixing temperatures were 180° C. and 140° C.; the high and low mixing times were 2 hours and 30 minutes. In addition a center point at 2% additive, 0.8 g/sec addition rate, 160° C. and 75 minutes mixing time was included in the design. Blends were made in two different penetration grade asphalts, 200/300 penetration base asphalt, the softest and 150/200 penetration base asphalt, the hardest. The results of this DOE are shown in FIG. 8. What the results show is that the sulfonic acid modification of asphalt works the same across the range of treatment levels, across the range of addition rates, across the range of mixing temperatures and across the range of mixing times. The preferred variables are 1–3% additive, 0.1 g/sec to 1.5 g/sec addition rate, mixing temperature of 140–170° C. and mixing time of 30 minutes to 2 hours; more preferably 1–2% additive, 0.5 g/sec to 1.0 g/sec addition rate, mixing temperature of 140–160° C. and mixing time of 1 to 2 hours; most preferably 1% additive, 0.8 g/sec addition rate, mixing temperature of 140–150° C. and mixing time of 75 minutes.

What is claimed is:

1. High performance grade paving asphalt having a SUPERPAVE™ binder specification improved in the HT direction or both the HT and LT direction produced from lower performance grade paving asphalt by addition to the lower performance grade paving asphalt of a minor quantity of a linear or branched chain $C_8$–$C_{48}$ alkyl aromatic sulfonic acid at a temperature of 175° C. and less in the absence of any air blowing during the processing sequence.

2. The high performance grade paving asphalt of claim 1 wherein the lower performance grade paving asphalt used as the starting material is an asphalt having a performance grade rating of PG 52-34/PG 52-28/PG 58-28/PG 64-22 and lower.

3. The high performance grade paving asphalt of claim 1 wherein the performance grade of the high performance grade asphalt is at least PG 58-34/PG 64-28.

4. The high performance grade paving asphalt of claim 1 wherein the performance grade of the high performance grade asphalt is PG 64-34 and higher.

5. The high performance grade paving asphalt of claim 1 wherein the amount of $C_8$–$C_{24}$ alkyl aromatic sulfonic acid added to the lower performance grade asphalt is from 0.5 to 10 wt %.

6. The high performance grade paving asphalt of claim 1 wherein the temperature of addition is up to 170° C.

7. The high performance grade paving asphalt of claim 1 wherein the temperature of addition is up to 160° C.

8. The high performance grade paving asphalt of claim 1 wherein the temperature of addition is between 140–160° C.

9. The high performance grade paving asphalt of claim 1, 2, 3 or 5 wherein the linear or branched chain $C_8$–$C_{48}$ alkyl aromatic sulfonic acid is of the formula:

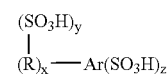

wherein x is an integer ranging from 1 to 5, R is (a) a straight chain alkyl group of 8–48 carbons, (b) a branched chain alkyl group wherein each branch has from 8–24 carbons and the total number of carbons does not exceed 48, (c) mixtures of (a) and (b), y is an integer ranging from 0 to 4, z is an integer ranging from 0 to 4, and wherein (y+z) ranges from 1 to 4, and Ar is an aromatic moiety having 1, 2 or 3 rings or mixtures thereof.

10. The high performance grade paving asphalt of claim 9 wherein R is a straight chain alkyl group of 10 to 36 carbons.

11. The high performance grade paving asphalt of claim 9 wherein R is a branched chain alkyl group each branch having from 8 to 24 carbons, the total number of carbons not exceeding 36.

12. The high performance grade paving asphalt of claim 9 wherein R is a branched chain alkyl group each branch having from 8 to 24 carbons, each branch having further branching with methyl, ethyl or mixture of methyl and ethyl groups provided the total number of carbons attributable to the methyl and/or ethyl groups does not exceed 10, to total number of carbons in the R group not exceeding 48.

13. The high performance grade paving asphalt of claim 9 wherein Ar is an aromatic moiety having 1, 2 or 3 rings or mixtures thereof and wherein the multi ring aromatics are fused, Spiro or linked by an alkylene linkage having 1 to 6 carbons.

14. The high performance grade paving asphalt of claim 9 wherein R is a straight chain alkyl group of 12–18 carbons.

15. The high performance grade paving asphalt of claim 9 wherein the amount of alkyl aromatic sulfonic acid employed ranges from about 0.5 to about 5 wt %, the temperature of addition is up to about 170° C. and in the alkyl aromatic sulfonic acid x is 1, z is 0, y is 1, and Ar is phenyl or naphthyl.

16. The high performance grade paving asphalt of claim 9 wherein the amount of alkyl aromatic sulfonic acid employed ranges from about 0.5 to about 5 wt %, the temperature of addition is up to about 170° C. and in the alkyl aromatic sulfonic acid x is 1, z is 1, y is 0, and Ar is phenyl or naphthyl.

* * * * *